United States Patent Office 3,166,631
Patented Jan. 19, 1965

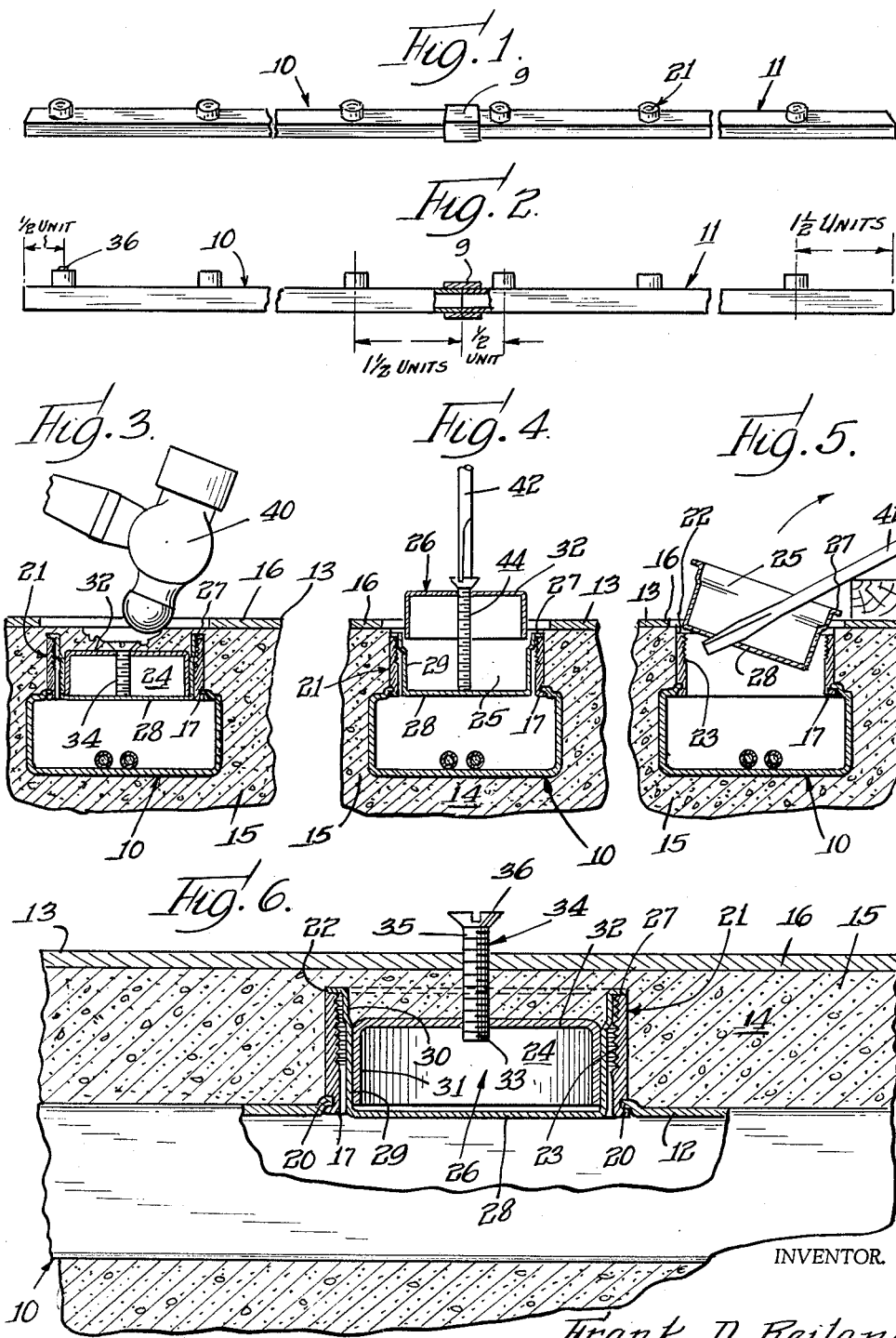

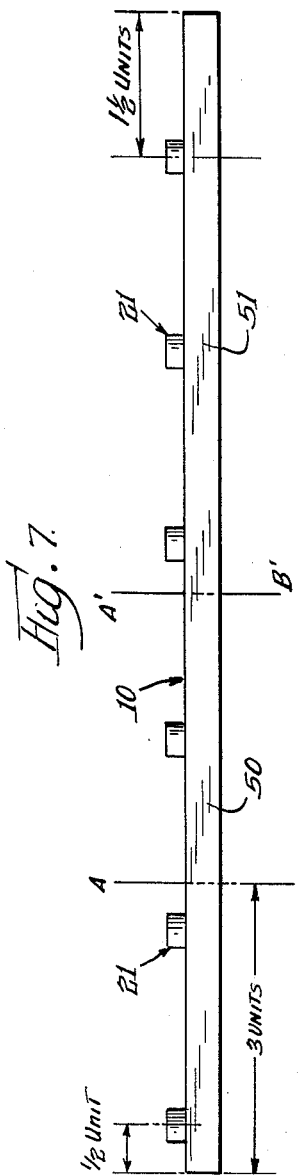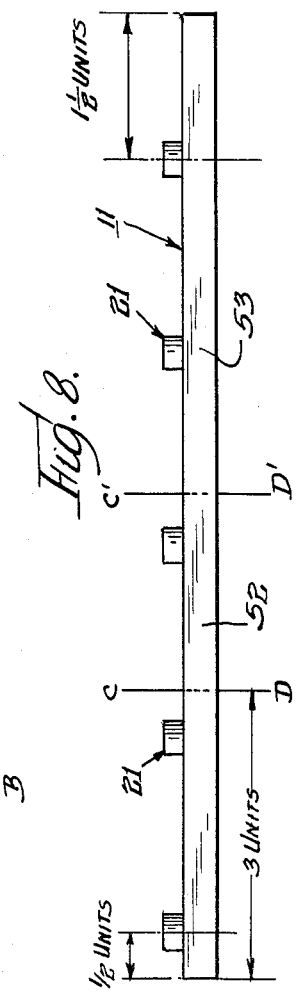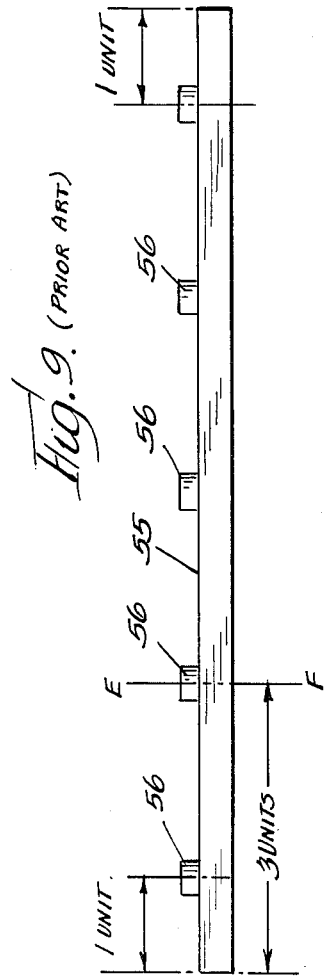
Fig. 7.
Fig. 8.
Fig. 9. (PRIOR ART)
INVENTOR.
Frank D. Reiland
BY
Paul J. Rose
Atty.

3,166,631
UNDERFLOOR DUCT WITH PARTICULARLY
SPACED ACCESS OPENINGS
Frank D. Reiland, Chicago, Ill., assignor to Square D
Company, Park Ridge, Ill., a corporation of Michigan
Continuation of application Ser. No. 760,961, Sept. 15,
1958. This application Sept. 28, 1962, Ser. No. 226,960
2 Claims. (Cl. 174—49)

The present invention relates to concealed underfloor wiring duct systems of the type commonly employed for housing wiring for supplying different kinds of electrical service at various locations or regions of the floor area, for example, wiring for supplying electric current of suitable voltage for the energization of motorized equipment, wiring for supplying low voltage electric current for energizing inter-office communication or call systems, and telephone wiring.

The invention has particular reference to standard stock lengths of tubular duct having access openings and corresponding tubular inserts or fittings spaced longitudinally therealong in a novel manner which eliminates scrap in the formation of a duct assembly, and to a combined marker cap and access opening of the class shown and described in my copending application, Serial No. 802,723, now Patent No. 3,061,663 filed on March 31, 1959, for Underfloor Duct System. This application is a continuation of my former application, Serial No. 760,-961 now abandoned, filed on September 15, 1958, for Marker Cap and Closure Device for the Access Openings of Underfloor Duct Systems.

In duct systems of the above general class, the ducts are in the form of elongated metal tubes, generally rectangular in transverse cross-section, with the ducts being arranged in single or multiple parallel runs, depending upon the number of electrical services to be provided. The various individual or multiple runs usually are spaced apart a predetermined distance and they may be connected together by cross runs, providing a checkerboard type of network including junction boxes and outlet boxes from which the various runs may extend outwardly in radial fashion. Service facilities may be provided through access openings having tubular inserts associated therewith extending from the top of the duct upwardly toward the floor surface.

Heretofore, it has long been the practice to prefabricate such ducts in standard ten-foot lengths with the access openings and their associated tubular inserts equally spaced at two-foot intervals and so arranged that the two outermost or end inserts are disposed one foot from their respective adjacent ends of the duct. With this arrangement, it is impossible to cut one foot, three feet, or five feet, from a duct section without cutting through an access insert. Thus, in an assembly of duct sections having a total length of an odd number of feet, if cutting through an access insert is to be avoided and uniform spacing of access inserts throughout the assembly is to be maintained, extra cuts must be made and scrap is thereby produced.

In accordance with the present invention, two different duct lengths are available as standard lengths, and in each of these lengths, the uniform spacing of access inserts has been preserved, but the position of the series of access openings and inserts, considered collectively, has been shifted, so that any whole number of feet may be cut from a duct section without cutting through an access insert, and scrap is eliminated, since both pieces produced by the cut are usable.

Tubular access inserts in conventional underfloor duct systems may extend substantially to the finished floor surface where the rims of the caps are exposed in the plane of the floor, but such inserts are objectionable since they are unsightly in appearance and present hazards to normal walking facilities.

Frequently, in conventional systems, the rims of the inserts are caused to extend upwardly only to a plane slightly below the floor surface where they are covered by a thin layer of the concrete or other floor material so that their presence may be detected with but a small amount of exploration. The upper ends of such inserts are frequently closed by knockout type closure members having central depressions therein in which some of the floor material is received, so that, in the finished installation, the outlet will be completely concealed to the end that the floor surface will present a smooth unbroken exterior. In such instances the layout of the duct system beneath the floor surface with reference to the adjacent walls, or permanent partitions, radiator or water pipes, and the like must be known or recorded to facilitate exploration operations. Furthermore, even when the layout is known and a given outlet opening located, considerable difficulty is encountered in chipping away the floor surface and extracting the closure cap from the metal insert.

The present invention is designed to overcome the above noted limitations that are attendant upon the construction and use of conventional duct systems and, to this end, contemplates the provision of a novel form of access opening insert and closure cap therefor, which cap, in the combination, affords a simple and readily accessible means whereby the closure cap may be easily removed from the insert when desired, and which, additionally, affords a visible indicia or reference element capable of being considered in connection with one or more other similar indicia or reference elements of the system for locating other non-visible access openings.

The provision of a novel form of access opening insert, and closure means therefor, which, as outlined above, affords a convenient reference indicia for the ready finding thereof, as well as for the ready finding of predeterminedly positioned other such units in the system, and which additionally reduces labor costs in the extraction of the closure means from the insert in an existing installation, together with a novel arrangement of the spaced access openings along duct sections, enabling the duct sections to be manufactured in different predetermined sizes to facilitate compounding of the lengths to accommodate runs of varying extent with a minimum of cutting and elimination of scrap, are among the principal objects of the present invention. Other objects and advantages of the invention will appear when the following specification is considered along with the accompanying drawings in which:

FIGURE 1 is a perspective view of an assembly of two standard lengths of duct section having tubular access inserts thereon constructed and spaced in accordance with the invention, an intermediate portion of each duct section being broken away.

FIGURE 2 is an elevational view of the duct sections of FIGURE 1 shown partially in section at the joint;

FIGURES 3, 4 and 5 are enlarged sectional views taken through an access insert transversely of a duct section of FIGURES 1 and 2, and illustrating schematically the manner in which a closure cap assembly associated therewith is removed from an installation;

FIGURE 6 is a still further enlarged fragmentary sectional view taken through an access insert longitudinally of a duct section of FIGURES 1 and 2;

FIGURE 7 is a full elevational view of the duct section on the left in FIGURES 1 and 2;

FIGURE 8 is a full elevational view of the duct section on the right in FIGURES 1 and 2; and FIGURE 9 is a full elevational view of a duct section constructed in accordance with the teachings of the prior art.

As used herein, the term "standard length" means a length of duct or duct section available from stock as manufactured.

A standard length conduit or duct section 10 constructed in accordance with the invention is best shown in FIGURES 1, 2, and 7. The duct section 10 is adapted to constitute one section of a concealed multiple-section underfloor wiring duct assembly such as has been fragmentarily shown in FIGURES 1 and 2 wherein two such duct sections 10 and 11 are illustrated as being arranged in end-to-end communicating relationship. According to the present invention, the conduit sections 10 and 11 are of standard lengths intended to be furnished as such by the manufacturer, the two lengths being different but both being multiples of a selected unit of length, for example a unit of one foot. Except for their difference in longitudinal extent, the two conduit sections 10 and 11 are identical and therefore a description of one will suffice for the other.

The conduit sections 10 and 11 are connected by a sleeve 9 and are each provided with an upper wall 12 adapted to extend parallel to the upper tread surface 13 of an embedding floor structure such as has been designated in its entirety at 14. The floor structure 14 may be largely of concrete 15 with a floor covering 16 of permanent tile, linoleum or other suitable floor veneer or tread which provides the upper tread surface 13, although, in certain installations, the concrete or other floor foundation material may afford the tread surface 13. The upper wall 12 is provided with a series of circular access openings 17 (FIGURES 3 to 6 inclusive), the openings 17 and corresponding tubular inserts or fittings 21 to be later described being equally spaced along the length of the upper wall 12, for example with centers two units of length apart, and in accordance with the invention, with the extreme left-hand insert 21 as viewed in FIGURES 1 and 2 centered one-half of a unit of length from the adjacent end of the conduit, and the extreme right-hand insert 21 centered one and one-half units of length from the other end of the conduit. Six such tubular inserts 21 are provided on the conduit 10, as shown best in FIGURE 7, while five of the inserts 21 are provided on the conduit 11, as shown best in FIGURE 8. The length of the conduit 10 is twelve units of length while the length of the conduit 11 is ten units of length, so that if each unit of length were considered to be one foot, the span of the two complete conduit sections 10 and 11 as shown in FIGURE 2 would be twenty-two feet.

The spacing described above permits the sections 10 and 11 to be cut exactly in half, as indicated by the lines A′B′ and C′D′ in FIGURES 7 and 8, respectively, without interfering with an access opening and its associated insert structure, subsequently to be described. Thus, using only conduit sections of full standard length, such as sections 10 and 11, and conduit sections of half standard length, such as sections 50 and 51 into which the line A′B′ divides section 10 and sections 52 and 53 into which the line C′D′ divides section 11, duct assemblies of lengths which are whole multiples of one unit of length and which are longer than nineteen units of length may be formed, while maintaining the equal spacing of the access openings 17. Furthermore, for duct assemblies having a run shorter than nineteen feet, assemblies having lengths of five, six, ten, eleven, twelve, fifteen, sixteen, seventeen, and eighteen units of length may be attained, utilizing only conduit sections of full and half standard lengths, with no special cuts and no scrap.

The halves 50 and 51 of the conduit 10 are identical, each having three tubular inserts 21 with one tubular insert centered one-half unit of length from one end of the duct section and another tubular insert centered one and one-half units of length from the other end, but the halves 52 and 53 of the conduit 11 are different, section 52 having three tubular inserts with the outer two centered one-half unit of length from their respective adjacent ends of the duct section, and section 53 having only two tubular inserts centered one and one-half units of length from their respective adjacent ends of the duct section.

A duct section constructed in accordance with the invention can also be cut in two at any point along its length without cutting through a tubular access insert 21, so long as a cut length is an integral number of units of length, and regardless of whether sections of full standard length, such as sections 10 and 11, or sections of half standard length, such as sections 50, 52, and 53, are being considered. Thus, in FIGURE 7 a line AB is indicated as cutting three units of length off the full section 10 or the half section 50 without disturbing an access fitting 21, and in FIGURE 8 a line CD is indicated as cutting three units of length off the full section 11 or the half section 52 without disturbing an access fitting 21. Furthermore, on both the cut portion and the remainder, the centers of the end access fittings will still be either one-half unit of length or one and one-half units of length from the respective ends.

In contrast, FIGURE 9 shows a duct section 55 constructed in accordance with the prior art, the conduit 55 being ten units long and having access fittings 56 centered two units apart and the two extreme fittings being centered one unit from their respective ends of the duct section. With this construction, it is impossible to cut off an integral odd number of units of length without cutting through an access fitting 56. For example, a line EF is indicated as cutting off three units and passing through the center of an access fitting. Thus, in an assembly requiring a cut length of an integral odd number of units, to retain the original spacing of the access fittings in the assembly and at the same time avoid cutting through an access fitting, extra cuts, which produce scrap, must be made.

While the invention has been described with the suggestion of using a foot as the unit of length, any other length might be used for the unit of length, for example, three inches, six inches, or fiften inches, and the advantageous results of the particular spacing of the access fittings would still be obtained. Expressed algebraically, if "a" equals the unit of length, a conduit section constructed in accordance with the invention will have access fittings centered a distance of 2a from each other, and the extreme access fittings will be centered distances of a/2 and 3a/2 from the respective ends of the section.

The upper wall 12 of the conduit section 10 or 11, as the case may be, is dished upwardly as at 20 (FIGURE 6) around each opening, and staked or otherwise secured in the opening is the lower end of a tubular insert 21 of cylindrical design. In the manufacture of the duct sections the inserts 21 are preferably secured in position within their respective openings and the sections are then galvanized by a dipping process to seal the joints with a heavy coating of zinc, thus rendering the sections completely moisture-proof, as well as eliminating any possibility of galvanic deterioration due to the sacrificial nature of the zinc involved. The longitudinal extent of each tubular insert 21 is such that the open upper rim 22 thereof slightly underlies the upper surface of the concrete portion 15 of the floor structure 14, the distance involved being controlled by the pouring of the concrete at the time the floor structure is formed. The upper region of the insert 21 is threaded interiorly as at 23 for threaded reception therein of the lower end of a nipple (not shown), a stand-pipe or the like, leading to an outlet box or similar structure to which electrical current is to be supplied.

Each tubular insert 21 is provided with a removable composite closure device 24 including an outer rim-seal in the form of an imperforate cup-shaped sealing plug 25 which may be formed as a sheet metal stamping, and a cooperating inner seal 26 in the form of an inverted cup-shaped sealing plug which may also be a sheet metal stamping. The outer plug is formed with an upper annular rim flange 27 adapted to seat on the circular rim 22 of the insert 21 with the body of the plug depending into the rim opening with the bottom wall 28 of the plug lying substantially in the horizontal plane of the upper wall 12 of the conduit section so that no internal shoulders or other obstructions are presented to hinder the pulling of wires through the conduit section. The generally cylindrical wall 29 of the outer plug 25 is formed with an inward offset 30 so that the major portion of the wall will clear the threaded interior of the insert 21 and thus reduce friction when the plug is pried loose from the insert, as well as to permit limited tilting of the insert during the prying operation as will be described presently.

The inner sealing plug 26 has its side wall 31 telescopically and frictionally received within the inwardly offset portion of the side wall 29 of the outer plug and the circular crown portion 32 of the plug 26 is formed with a threaded hole 33 centrally thereof in which hole there is threadedly received a conventional screw 34 having a threaded shank and an enlarged head 36. As shown in FIGURE 3, and as furnished by the manufacturer, the screw 34 is of a length such that when it is fully threaded through the hole 33, the lower end thereof engages the bottom wall 28 of the outer plug 25 while the head 36 immediately overlies the crown portion 32 of the inner plug 26.

The conduit sections 10 and 11 are furnished by the manufacturer with the screws 34 fully threaded into the holes 33 and, except for special installations involving use of the screws 34 as reference indicia as will be described presently, the sections may be installed in a given floor installation with the screws so positioned. When, at any time after an installation has been made, it is desired to make use of a given access opening, the opening is first located by use of such reference indicia and a hole may be cut in the floor covering 16 immediately above the insert 21. A sharp blow with the blunt end of a ball hammer such as has been shown at 40 in FIG. 3 will serve to loosen or crack the concrete 15 at this region so that it may be chipped out to clear the region above the insert. Thereafter, utilizing a suitable tool such as the screw driver shown at 42 in FIGURE 4, the screw 34 may be removed from the hole 33 and a longer screw 44 threaded into the hole 33 and caused to engage the bottom wall 28 of the outer plug 25. Continued turning movement of the screw 44 will cause the inner plug 25 to be elevated until such time as it clears the upper rim of the outer plug, the bottom wall 28 serving as a reaction member to assimilate the thrust of the screw 44. Finally, utilizing the screw driver 42 to cut through the bottom wall 28 of the outer plug 25, the latter plug may be pried from its seat within the rim of the insert 21, the clearance region between the offset portion of the wall 29 and the inner face of the insert 21 facilitating the prying operation. To further facilitate prying operations, a wooden or other block 46 may be employed as a fulcrum, thus affording protection to the upper floor covering 16. With both plugs thus removed, the necessary electrical connections may be made in the usual manner of making electrical installations.

With reference to FIGURE 2, the inner plug 24 and its contained screw 34 may be employed as a marker device for rendering a visual indication of the location of its associated insert 21. By backing up on the screw prior to concrete pouring operations so that the screw assumes the elevated position shown in FIGURE 6, the head 36 of the screw may be exposed above the level of the concrete as well as above the level of the floor covering 16. The screw may be caused to protrude as shown in FIGURE 6, or it may be caused to remain flush with the upper surface of the floor covering. In either instance it will be understood that a suitable hole will be provided in the floor covering 16 for passage of the screw therethrough. Alternatively, the screw head may be allowed to remain flush with the concrete line where the upper surface of the floor 36 only is visible when the floor covering or a portion thereof is removed. This latter procedure will be found effective where the floor covering 16 is constructed of individual tile-like sections which are capable of individual removal for exploration purposes.

In order to indicate the direction of any given duct run, it is merely necessary to utilize two marker screws 34 at the opposite ends of the run for indicia purposes. Such screws may be caused to project above the floor surface as previously described and all intermediate or intervening access opening inserts may readily be located by cumulatively measuring two unit-lengths between the two protruding marker screws. Where there are intervening permanent walls or room panels, a marker screw on each side of the same may be used for marker purposes.

The invention is not to be limited to the exact arrangement of parts shown in the accompanying drawings or described in this specification since various changes in the details of construction may be resorted to without departing from the spirit of the invention. Only insofar as the invention has particularly been pointed out in the accompanying claims is the same to be limited.

I claim:

1. For use in an underfloor duct assembly for distributing electrical conductors, a standard-length tubular duct having at least three access fittings spaced longitudinally therealong, the centers of each of said access fittings being equally spaced a predetermined distance from each other, and the centers of the two access fittings adjacent the respective ends of the duct being spaced from the respective ends of the duct by unequal distances whose sum equals said predetermined distance by which said centers of said access fittings are spaced from each other, said spacing of said access fittings enabling said duct to be cut transversely in two at any point along its length without cutting through an access fitting so long as a cut length is an integral multiple of one-half of said predetermined distance.

2. For use in an underfloor duct assembly for distributing electrical conductors, a standard-length tubular duct including a wall portion having at least three separate access openings extending therethrough and defined respectively by a corresponding number of inner edge portions of said wall portion, said access openings being arranged in a straight row and spaced from each other longitudinally of said duct, the centers of each of said access openings being equally spaced a predetermined distance from each other, and the centers of the two access openings adjacent the respective ends of the duct being spaced from the respective ends of the duct by unequal distances whose sum equals said predetermined distance by which said centers of said access openings are spaced from each other, said spacing of said access openings enabling said duct to be cut transversely in two at any point along its length without cutting through one of said inner edge portions of said wall portion defining an access opening so long as a cut length is an integral multiple of one-half of said predetermined distance.

References Cited in the file of this patent

UNITED STATES PATENTS

| | | |
|---|---|---|
| 1,825,049 | Chamberlain | Sept. 29, 1931 |
| 1,898,087 | Fullman | Feb. 21, 1933 |
| 2,207,301 | Robinson | July 9, 1940 |
| 2,672,749 | Wiesmann | Mar. 23, 1954 |